(12) United States Patent
Gokmen (10) Patent No.: US 12,321,852 B2
(45) Date of Patent: Jun. 3, 2025

(54) FILTERING HIDDEN MATRIX TRAINING DNN

(71) Applicant: International Business Machines Corporation, Armonk, NY (US)

(72) Inventor: Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 17/134,377

(22) Filed: Dec. 26, 2020

(65) Prior Publication Data

US 2022/0207344 A1    Jun. 30, 2022

(51) Int. Cl.
  *G06N 3/08*    (2023.01)
  *G06F 17/16*   (2006.01)
  (Continued)

(52) U.S. Cl.
  CPC ............... *G06N 3/08* (2013.01); *G06F 17/16* (2013.01); *G06N 3/04* (2013.01); *G06N 3/065* (2023.01)

(58) Field of Classification Search
  CPC . G06N 3/04; G06N 3/065; G06N 3/08; G06F 17/16
  See application file for complete search history.

(56) References Cited

U.S. PATENT DOCUMENTS 9,646,243 B1 * 5/2017 Gokmen .................. G06N 3/08
9,779,355 B1   10/2017 Leobandung
  (Continued)

FOREIGN PATENT DOCUMENTS

CN    107688850 A    2/2018
CN    108090565 A    5/2018
  (Continued)

OTHER PUBLICATIONS

Burr et al., "Experimental Demonstration and Tolerancing of a Large-Scale Neural Network (165000 synapses) Using Phase-Change Memory as the Synaptic Weight Element," IEEE Transactions on Electronic Devices, vol. 62, No. 11, pp. 3498-3507, Nov. 2015 (Year: 2015).*

(Continued)

*Primary Examiner* — Eric J. Bycer
(74) *Attorney, Agent, or Firm* — Gavin Giraud (57) ABSTRACT

In one aspect, a method of training a DNN includes transmitting an input vector x through a weight matrix W and reading a resulting output vector y, transmitting an error signal δ, transmitting the input vector x with the error signal δ through conductive row wires of a matrix A, and transmitting an input vector $e_i$ and reading a resulting output vector y' as current output. The training also includes updating a hidden matrix H comprising an H value for RPU devices by iteratively adding the output vector y' multiplied by the transpose of the input vector $e_i$ to each H value. The training also includes, when an H value reaches a threshold value, transmitting the input vector $e_i$ as a voltage pulse through the conductive column wires of the matrix W simultaneously with sign information of the H values that reached a threshold value as voltage pulses through the conductive row wires matrix W.

3 Claims, 11 Drawing Sheets

(51) Int. Cl.
*G06N 3/04* (2023.01)
*G06N 3/065* (2023.01)

(56) References Cited

U.S. PATENT DOCUMENTS

| | | | |
|---|---|---|---|
| 10,134,472 B1 | 11/2018 | Leobandung | |
| 10,319,439 B1 | 6/2019 | Li | |
| 10,373,051 B2 | 8/2019 | Gokmen | |
| 2015/0170025 A1* | 6/2015 | Wu | G06N 3/065 706/25 |
| 2016/0049195 A1* | 2/2016 | Yu | G11C 13/0026 365/63 |
| 2017/0061281 A1 | 3/2017 | Gokmen | |
| 2018/0005110 A1 | 1/2018 | Gokmen | |
| 2018/0060726 A1 | 3/2018 | Gokmen | |
| 2018/0075338 A1* | 3/2018 | Gokmen | G06N 3/045 |
| 2018/0253642 A1 | 9/2018 | Gokmen | |
| 2019/0050734 A1* | 2/2019 | Li | G06N 3/04 |
| 2019/0122105 A1* | 4/2019 | Boybat Kara | G06N 3/048 |
| 2019/0318239 A1* | 10/2019 | Kim | G06N 3/08 |
| 2020/0349440 A1* | 11/2020 | Gokmen | G06N 3/063 |
| 2021/0240684 A1* | 8/2021 | Xiao | G06F 16/2237 |
| 2022/0093351 A1* | 3/2022 | Jhuang | H01H 13/88 |

FOREIGN PATENT DOCUMENTS

| | | |
|---|---|---|
| CN | 110309856 A | 10/2019 |
| CN | 110352436 A | 10/2019 |
| KR | 20180035073 A | 4/2018 |
| WO | 2019/202427 A1 | 10/2019 |
| WO | 2020222064 A1 | 11/2020 |
| WO | 2019/207404 A1 | 5/2021 |

OTHER PUBLICATIONS

Chen et al., "Technology-Design Co-optimization of Resistive Cross-point Array for Accelerating Learning Algorithms on Chip," 2015 Design, Automation & Test in Europe Conference & Exhibition, pp. 854-859 (Year: 2015).*
Gokmen et al., "Acceleration of Deep Neural Network Training with Resistive Cross-Point Devices: Design Considerations," frontiers in Neuroscience, vol. 10, Jul. 2016, 13 pgs. (Year: 2016).*
Gokmen et al., "Training Deep Convolutional Neural Networks with Resistive Cross-Point Devices," frontiers in Neuroscience, vol. 11, Oct. 2017, 13 pgs. (Year: 2017).*
Gil et al., "The Future of Computing: Bits+ Neurons+ Qubits", IBM Thomas J. Watson Research Center, Yorktown Heights, NY, arXiv preprint arXiv:1911.08446, 2019, 30 Pages.
Gokmen et al., "Algorithm for training neural networks on resistive device arrays", Frontiers in Neuroscience, vol. 14, 2020, Article 103, Original Research, doi: 10.3389/fnins.2020.00103, IBM Research AI, Yorktown Heights, NY, United States, Feb. 26, 2020, 16 Pages.
Gokmen, Tayfun, "DNN Training With Asymmetric RPU Devices", U.S. Appl. No. 16/400,674, filed May 1, 2019, 38 Pages.
Krestinskaya et al., "Learning in memristive neural network architectures using analog backpropagation circuits", IEEE Transactions on Circuits and Systems I: Regular Papers, vol. 66, No. 2, pp. 719-732, Feb. 2019, 14 Pages.
Japan Patent Office, "Decision to Grant a Patent" Feb. 21, 2025, 5 Pages, JP Application No. 2023-539103.

* cited by examiner

FILTERING HIDDEN MATRIX TRAINING DNN

BACKGROUND

The present invention relates generally to deep neural network (DNN) training, and more particularly, to techniques for filtering signals from resistive processing unit (RPU) devices to reduce noise.

A deep neural network (DNN) can be embodied in an analog cross-point array of resistive devices such as the resistive processing units (RPUs). RPU devices generally include a first terminal, a second terminal and an active region. A conductance state of the active region identifies a weight value of the RPU, which can be updated/adjusted by application of a signal to the first/second terminals.

DNN based models have been used for a variety of different cognitive based tasks such as object and speech recognition and natural language processing. DNN training is needed to provide a high level of accuracy when performing such tasks. Training large DNNs is a computationally intensive task. Most popular methods of DNN training, such as backpropagation and stochastic gradient decent (SGD), require the RPUs to be "symmetric" to work accurately. Symmetric analog resistive devices change conductance symmetrically when subjected to positive and negative voltage pulses. In practice, however, RPU devices can exhibit non-linear and non-symmetric switching characteristics. For instance, when voltage pulses are applied to adjust the weight up or down, there is often an imbalance between up and down adjustments.

SUMMARY

The present invention provides techniques for training a deep neural network (DNN). The method includes transmitting an input vector x as voltage pulses through conductive column wires of a weight matrix W and reading a resulting output vector y as current output from conductive row wires of the weight matrix W. The weight matrix W may include resistive processing unit (RPU) devices separating intersections between the conductive column wires and the conductive row wires, so that the RPU devices function as weighted connections between neurons in the DNN. The training may further include transmitting an error signal δ calculated from the output vector y as voltage pulses through the conductive row wires and reading a resulting output vector z as current output from the conductive column wires. The training may further include transmitting the input vector x as voltage pulses through conductive column wires of a matrix A simultaneously with the error signal δ through conductive row wires of the matrix A. The training may further include transmitting an input vector $e_i$ as voltage pulses through the conductive column wires of the cross-point array A and reading a resulting output vector y' as current output from the conductive row wires of the cross-point array A. The training may further include updating a hidden matrix H having an H value $H_{ij}$ for each RPU device by iteratively adding the output vector y' multiplied by the transpose of the input vector $e_i$ to each H value. The training may further include, when an H value reaches a threshold value, transmitting the input vector $e_i$ as a voltage pulse through the conductive column wires of the matrix W simultaneously with sign information of the H values that reached a threshold value as voltage pulses through the conductive row wires matrix W.

Embodiments of the present invention also include a deep neural network (DNN). The DNN includes a matrix A having resistive processing unit (RPU) devices separating intersections between conductive row wires and conductive column wires, whereby the RPU devices comprise processed gradients for weighted connections between neurons in the DNN. The DNN also may include a weight matrix W comprising RPU devices separating intersections between conductive row wires and conductive column wires, whereby the RPU devices comprise weighted connections between neurons in the DNN. The DNN may further include a hidden matrix H having an H value for each RPU device in the weight matrix W. The H value may iteratively add a value from the A matrix until at least one H value is over a threshold.

A more complete understanding of the present invention, as well as further features and advantages of the present invention, will be obtained by reference to the following detailed description and drawings.

DETAILED DESCRIPTION

Provided herein are deep neural network (DNN) training techniques with asymmetric resistive processing unit (RPU) devices. As highlighted above, a DNN can be embodied in an analog cross-point array of RPUs. See, for example, the schematic diagram shown in FIG. 1.

Figure 1:
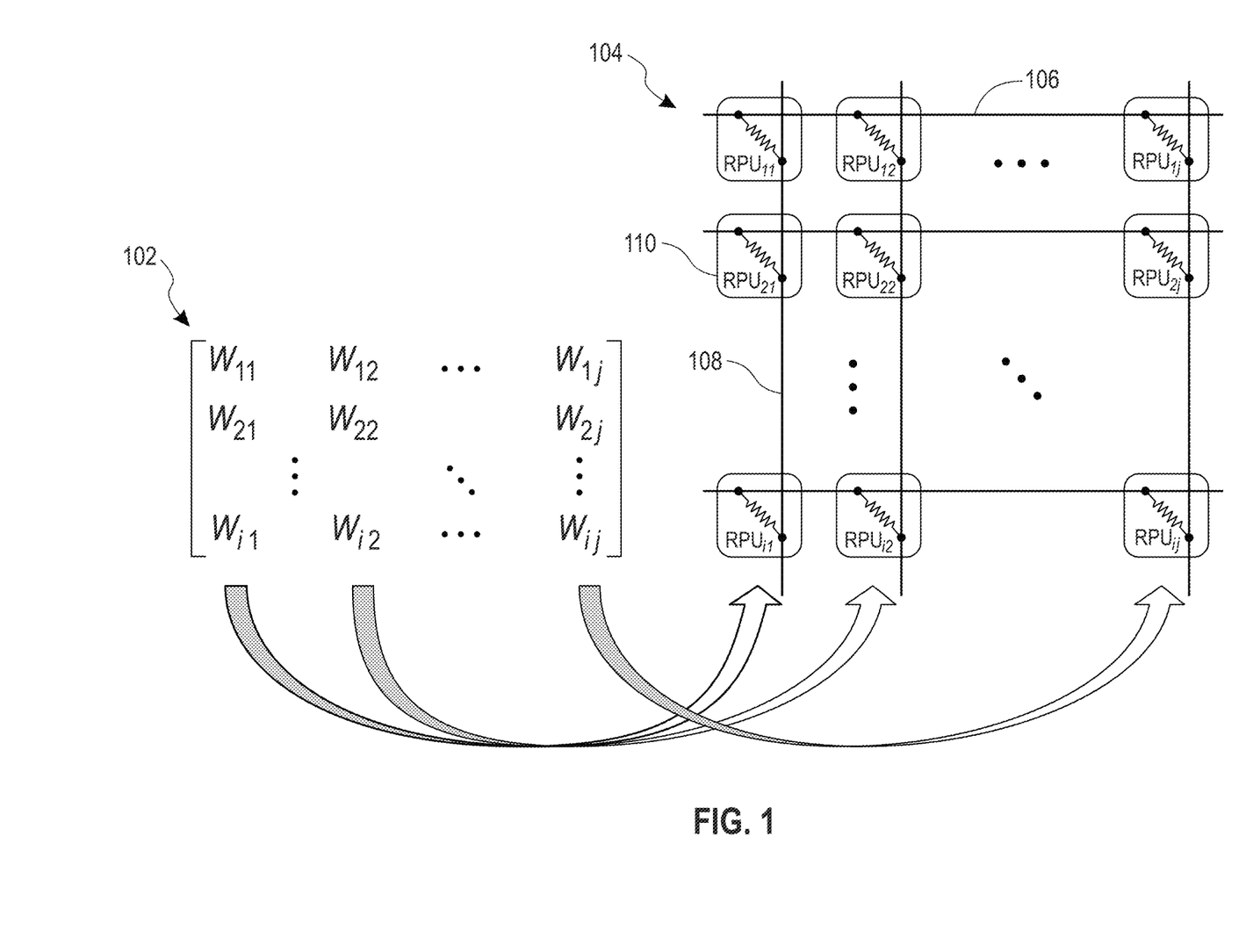
FIG. 1 is a diagram illustrating a deep neural network (DNN) embodied in an analog cross-point array of resistive processing unit (RPU) devices according to an embodiment of the present invention.

As shown in FIG. 1, each parameter (weight $w_{ij}$) of algorithmic (abstract) weight matrix 102 is mapped to a single RPU device ($RPU_{ij}$) on hardware, namely a physical cross-point array 104 of RPU devices. Cross-point array 104 includes a series of conductive row wires 106 and a series of conductive column wires 108 oriented orthogonal to, and intersecting, the conductive row wires 106. The intersections between the row and column wires 106 and 108 are separated by RPUs 110 forming cross-point array 104 of RPU devices. Each RPU can include a first terminal, a second terminal and an active region. A conduction state of the active region identifies a weight value of the RPU, which can be updated/adjusted by application of a signal to the first/second terminals. Further, three-terminal (or even more terminal) devices can serve effectively as two-terminal resistive memory devices by controlling the extra terminals.

Each RPU ($RPU_{ij}$) is uniquely identified based on its location in (i.e., the $i^{th}$ row and $j^{th}$ column) of the cross-point array 104. For instance, working from the top to bottom, and from the left to right of the cross-point array 104, the RPU at the intersection of the first row wire 106 and the first column wire 108 is designated as $RPU_{11}$, the RPU at the intersection of the first row wire 106 and the second column wire 108 is designated as $RPU_{12}$, and so on. Further, the mapping of the parameters of weight matrix 102 to the RPUs of the cross-point array 104 follows the same convention. For instance, weight $w_{i1}$ of weight matrix 102 is mapped to $RPU_{i1}$ of the cross-point array 104, weight $w_{i2}$ of weight matrix 102 is mapped to $RPU_{i2}$ of the cross-point array 104, and so on.

The RPUs 110 of the cross-point array 104, in effect, function as the weighted connections between neurons in the DNN. The conduction state (e.g., resistance) of the RPUs 110 can be altered by controlling the voltages applied between the individual wires of the row and column wires 106 and 108, respectively. Data is stored by alteration of the RPU's conduction state. The conduction state of the RPUs 110 is read by applying a voltage and measuring the current that passes through the target RPU 110. All of the operations involving weights are performed fully in parallel by the RPUs 110.

In machine learning and cognitive science, DNN based models are a family of statistical learning models inspired by the biological neural networks of animals, and in particular the brain. These models may be used to estimate or approximate systems and cognitive functions that depend on many inputs and weights of the connections which are generally unknown. DNNs are often embodied as so-called "neuromorphic" systems of interconnected processor elements that act as simulated "neurons" that exchange "messages" between each other in the form of electronic signals. The connections in DNNs that carry electronic messages between simulated neurons are provided with numeric weights that correspond to the strength or weakness of a given connection. These numeric weights can be adjusted and tuned based on experience, making DNNs adaptive to inputs and capable of learning. For example, a DNN for handwriting recognition is defined by a set of input neurons which may be activated by the pixels of an input image. After being weighted and transformed by a function determined by the network's designer, the activations of these input neurons are then passed to other downstream neurons. This process is repeated until an output neuron is activated. The activated output neuron determines which character was read.

Figure 2A:
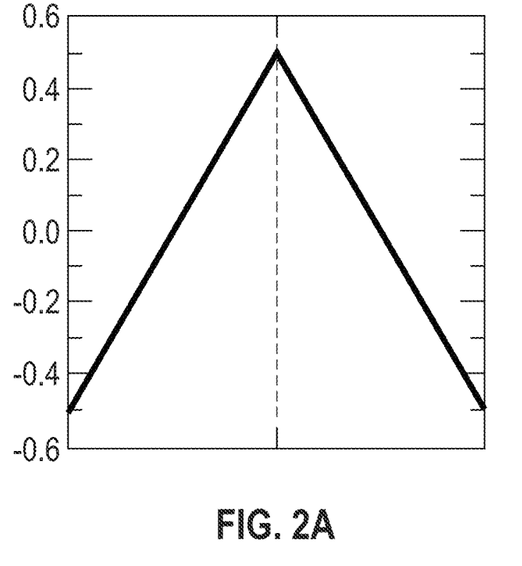
FIG. 2A is a diagram illustrating ideal switching characteristics of an RPU device that are linear and symmetric according to an embodiment of the present invention.

FIG. 2A is a diagram illustrating ideal switching characteristics of an RPU device that are linear and symmetric according to an embodiment of the present invention. As shown in FIG. 2A, the ideal RPU responds linearly and symmetrically to an external voltage stimuli. For training purposes, such an ideal device perfectly implements the DNN training process of backpropagation and stochastic gradient decent (SGD). Backpropagation is a training process performed in three cycles: a forward cycle, a backward cycle, and a weight update cycle which are repeated multiple times until a convergence criterion is met. Stochastic gradient decent (SGD) uses the backpropagation to calculate the error gradient of each parameter (weight $w_{ij}$).

To perform backpropagation, DNN based models are composed of multiple processing layers that learn representations of data with multiple levels of abstraction. For a single processing layer where N input neurons are connected to M output neurons, the forward cycle involves computing a vector-matrix multiplication (y=Wx) where the vector x of length N represents the activities of the input neurons, and the matrix W of size M×N stores the weight values between each pair of the input and output neurons. The resulting vector y of length M is further processed by performing a non-linear activation on each of the resistive memory elements and then passed to the next layer.

Once the information reaches to the final output layer, the backward cycle involves calculating the error signal and backpropagating the error signal through the DNN. The backward cycle on a single layer also involves a vector-matrix multiplication on the transpose (interchanging each row and corresponding column) of the weight matrix ($z=W^T\delta$), where the vector δ of length M represents the error calculated by the output neurons and the vector z of length N is further processed using the derivative of neuron non-linearity and then passed down to the previous layers.

Lastly, in the weight update cycle, the weight matrix W is updated by performing an outer product of the two vectors that are used in the forward and the backward cycles. This outer product of the two vectors is often expressed as $W \leftarrow W+\eta(\delta x^T)$, where η is a global learning rate.

All of the operations performed on the weight matrix W during this backpropagation process can be implemented with the cross-point array 104 of RPUs 110 having a corresponding number of M rows and N columns, where the stored conductance values in the cross-point array 104 form the matrix W. In the forward cycle, input vector x is transmitted as voltage pulses through each of the column wires 108, and the resulting vector y is read as the current output from the row wires 106. Similarly, when voltage pulses are supplied from the row wires 106 as input to the backward cycle, then a vector-matrix product is computed on the transpose of the weight matrix $W^T$. Finally, in the update cycle voltage pulses representing vectors x and δ are simultaneously supplied from the column wires 108 and the row wires 106. In this configuration, each RPU 110 performs a local multiplication and summation operation by processing the voltage pulses coming from the corresponding column wire 108 and row wire 106, thus achieving an incremental weight update.

As highlighted above, a symmetric RPU (see FIG. 2A) implements backpropagation and SGD perfectly. Namely, with such ideal RPUs $w_{ij} \leftarrow w_{ij} + \eta \Delta w_{ij}$, where $w_{ij}$ is the weight value for the $i^{th}$ row and $j^{th}$ column of the cross-point array 104.

Figure 2B:
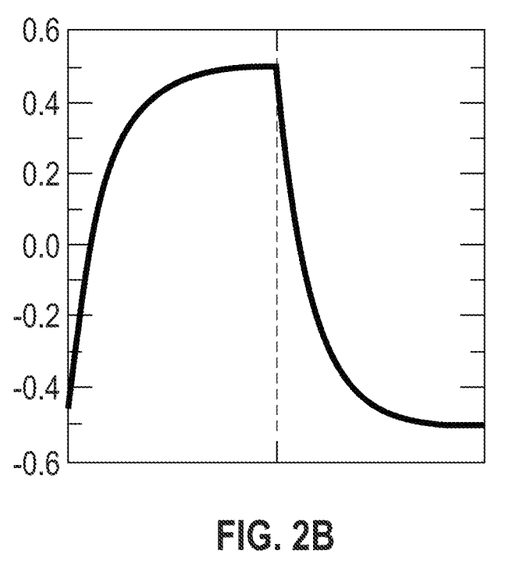
FIG. 2B is a diagram illustrating non-ideal switching characteristics of an RPU device that are non-linear and non-symmetric according to an embodiment of the present invention.

By contrast, FIG. 2B is a diagram illustrating non-ideal switching characteristics of an RPU device that are non-linear and non-symmetric according to an embodiment of the present invention. As shown in FIG. 2B, real RPUs can respond non-linearly and non-symmetrically to external voltage stimuli. Namely, when voltage pulses are applied to adjust the weight up or down (referred to herein as "up" and "down" pulses, respectively), the amount of weight update (i.e., the size of the steps) is linearly dependent on the current weight value. Thus, there is only a single weight value (corresponding to the zero weight value from the zero shifting technique described in detail below) where the up and down adjustments are equal in strength but otherwise imbalanced for the rest of the weight range. Assuming a set of up and down pulse sequence are given to the RPU device, this imbalance means that the device has a tendency to go up or down towards the symmetry point where the strengths of the up and down pulses are equal. This device behavior can be translated into an additional energy term (internal energy) that is originating from the RPU device's physics governing the conductance change in the RPU device. Thus, when used for backpropagation, these RPUs with non-ideal switching characteristics implement something very different from the ideal case, i.e., $w_{ij} \leftarrow w_{ij} + \eta \Delta w_{ij} F(w_{ij}) - \eta |\Delta w_{ij}| G(w_{ij})$, where $|\Delta w_{ij}| G(w_{ij})$ represents the additional energy term (internal energy) that shows up due to asymmetric switching characteristics of the RPU devices and $F(w_{ij})$ is the term that appears due to non-linearity in switching characteristics.

It has been found that with resistive memory devices, such as RPUs 110, that there is always one single symmetry point where the slopes of the up and down pulses for each device are exactly the same. This symmetry point (which can be different for each individual RPU) can be assigned to a weight value of zero.

The symmetry point for each RPU 110 in the cross-point array 104 is determined by applying repeated (first, second, third, etc.) up and down voltage pulses to the RPUs 110 in the weight array until all of the RPUs 110 in the weight array converge to their own symmetry point. For instance, if the conductance range is from Gmin to Gmax, and average delta G at one update incident is dGavg, then the effective number of states in the conductance range is (Gmax−Gmin)/dGavg. When a device is at the extreme points and alternating up/dn pulses are given, then it will take # of updates to reach the center point=(Gmax−Gmin)/dGavg. To ensure the convergence, one can give extra cycles of alternating up/dn pulses, e.g., n×(Gmax−Gmin)/dGavg, where n=1 or larger. The up and down voltage pulses can be applied to the RPUs 110 randomly (i.e., each pulse is randomly either an up or a down pulse), in an alternating manner (i.e., if the preceding pulse is an up pulse, then the next pulse is a down pulse, and vice versa), etc.

Once all of the RPUs 110 in the weight array have all converged to their own symmetry point, the conductance values for each RPU 110 from the weight array (at the symmetry point) are copied to a separate, reference array that is interconnected with the weight array. There is a one-to-one correlation between the devices in the weight array and reference array such that a unique zero-weight value can be established in each device in the reference array for one corresponding device in the weight array. Thus, during operation, the outputs of the RPUs 110 in the weight array are shifted by the zero-weight value from the corresponding devices stored in the reference array. For instance, the same signal can be provided to both the weight array and the reference array. The output from the RPUs 110 in the weight array (e.g., $I_1$, $I_2$, $I_3$, etc.) can then be zero-shifted by subtracting those values from the output of the corresponding devices in the reference array (set to a zero-weight value) to achieve zero-shifted results.

Figure 3:
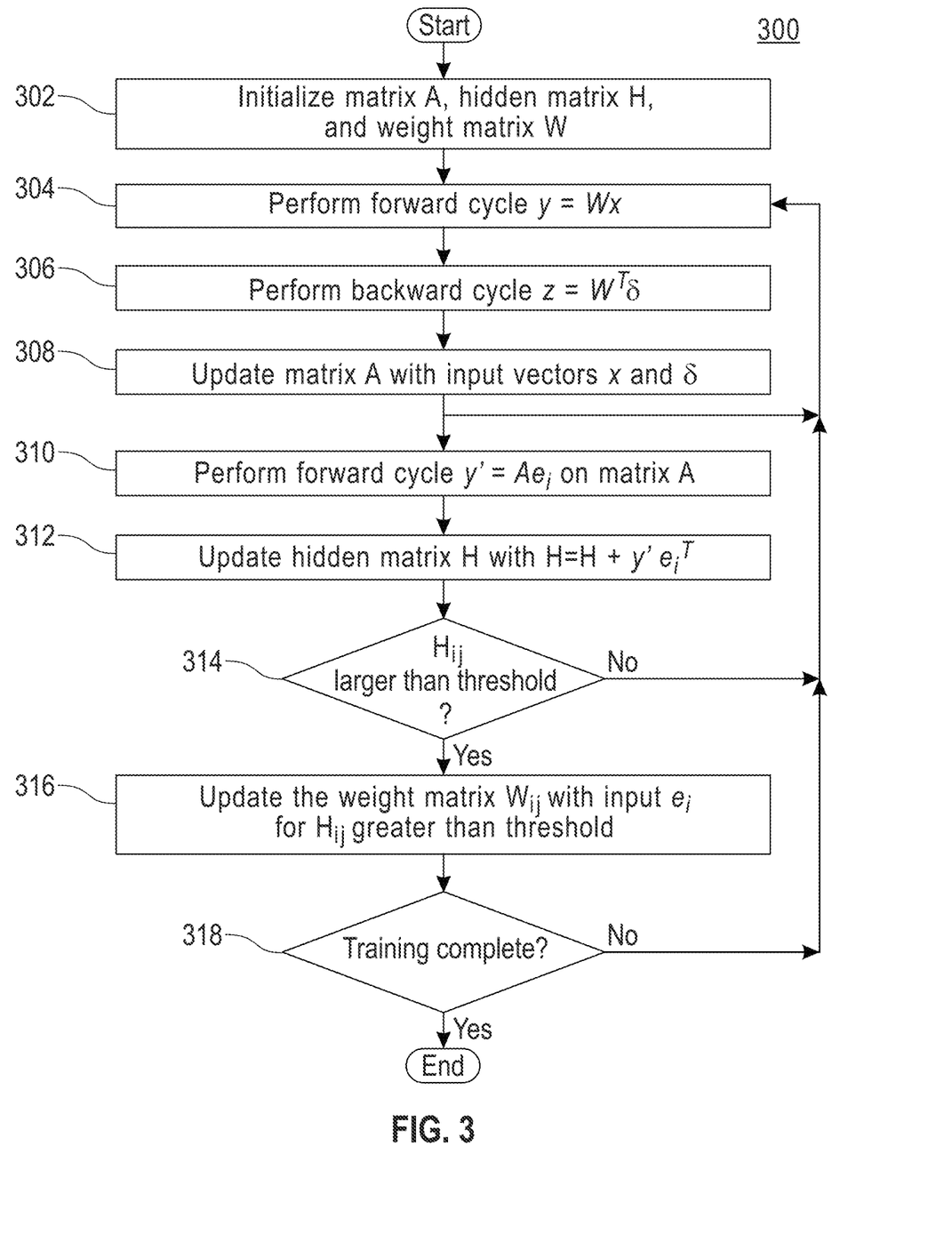
FIG. 3 is a diagram illustrating an exemplary methodology for training a DNN according to an embodiment of the present invention.

After this initial setting to achieve zero-shifted results, the present techniques are used to train the DNNs. FIG. 3 is a diagram illustrating an exemplary method 300 for training a DNN according to an embodiment of the present invention. During training, the weight updates are accumulated first on a matrix A. The matrix A is a hardware component made up of rows and columns of RPUs that have symmetric behavior around the zero point. The weight updates from the matrix A are then selectively moved to a weight matrix W. The weight matrix W is also a hardware component made up of rows and columns of RPUs. The training process iteratively determines a set of parameters (weights $w_{ij}$) that maximizes the accuracy of the DNN. During initialization, the reference array with the zero-weight values ensures that each RPU in a weight matrix A is at its equilibrium point for a value corresponding to zero. On the other hand, the matrix W is initialized to a randomly distributed values using the common practices applied for DNN training. The hidden matrix H (generally stored digitally though certain embodiments use an analog hidden matrix H) is initialized to zero. During training, the weight updates are performed on the matrix A. Then the information processed by matrix A is accumulated in the hidden matrix H (a separate matrix effectively performing a low pass filter). The values of the hidden matrix H that reach an update threshold are then applied to the weight matrix W. The update threshold effectively minimizes noise produced within the hardware of the matrix A. Advantageously, this weight matrix W minimizes the objective function of the neural network and matrix A is used to process the gradients of the objective function which are then passed through a digital low pass filter before feeding back into W. Therefore, the hardware bias and noise associated with non-ideal RPUs are tolerated (or absorbed by H matrix), and hence gives fewer test errors as compared to the standard SGD technique or other training techniques using asymmetric devices, even with a fewer number of states.

The method 300 begins by initializing the matrix A, the hidden matrix H, and the weight matrix W (block 302). Initializing the matrix A includes, for example, determining the symmetry point for each RPU in the matrix A and storing the corresponding conductance values to a reference array. As provided above, the symmetry point for each RPU device can be determined by applying repeated up and down voltage pulses (e.g., randomly, alternating, etc.) to the RPUs until all of the RPUs converge to their own symmetry point. The array A and the reference array can be embodied in two interconnected arrays and their combination forms the matrix A. Since physical conductance cannot be a negative quantity, the difference of the conductance values in array A and the reference array forms the logical value for the matrix A. However, the reference array is kept constant after the initial programming step, and we refer to matrix A and the array A in an interchangeable fashion as when matrix A is updated it is the array A that is being updated. However, for vector-matrix multiply operation performed on the matrix A always uses the differential reading of array A and the reference array. Same methodology and the operation principles also applies to the matrix W and the array W.

Figure 4:
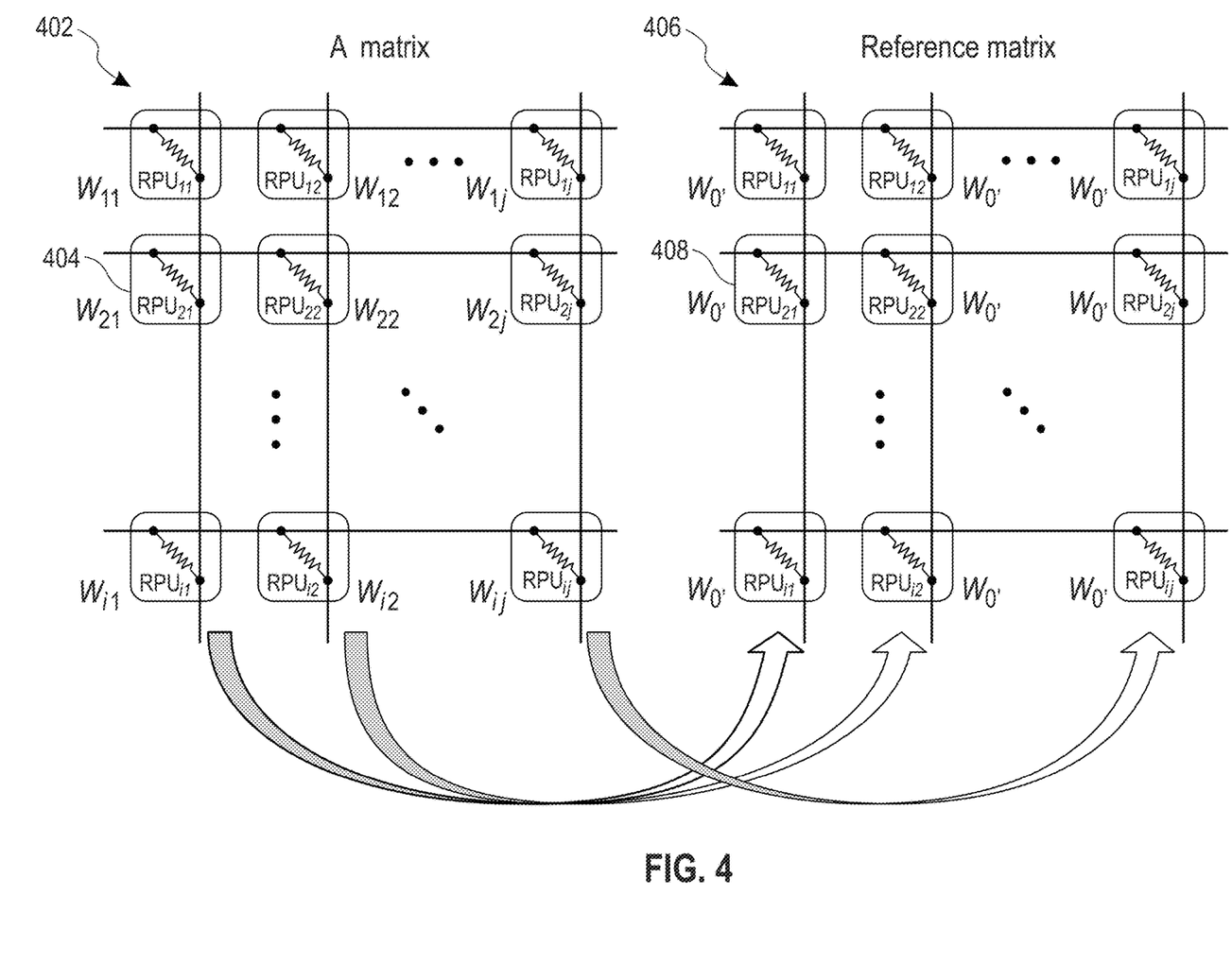
FIG. 4 is a diagram illustrating two interconnected arrays (i.e., an array W and a reference array) corresponding to a matrix W and the reference array is populated with the conductance value corresponding to the zero-weight values of the matrix W according to an embodiment of the present invention.

FIG. 4 is a diagram illustrating two interconnected arrays (i.e., a physical array and a reference array) corresponding to the matrix A and a reference array populated with the zero-weight conductance values of the matrix A according to an embodiment of the present invention. A cross-point array 402 of RPUs 404 (populated with the weight values (wij) of the matrix A) and a cross-point array 406 of RPUs 408 (populated with the corresponding zero-weight conductance values (w0') of the reference matrix) are shown. A unique zero-weight value (w0') can be established in each RPU in the reference matrix for one corresponding RPU in the matrix A. Initialization of the hidden matrix H includes zeroing the current values stored in the matrix, or allocating digital storage space on a connected computing device. Initialization of the weight matrix W includes loading the weight matrix W with random values so that the training process for the weight matrix W may begin.

Once the zero-weight conductance values have been stored in the reference array, training of the DNN is performed. Rather than only calculating the error gradient using backpropagation in three cycles (i.e., a forward cycle, a backward cycle, and a weight update cycle), here operations are filtered by a hidden matrix H that updates the weight value only after iterative combination of that H value grows to greater than a threshold.

Figure 5:
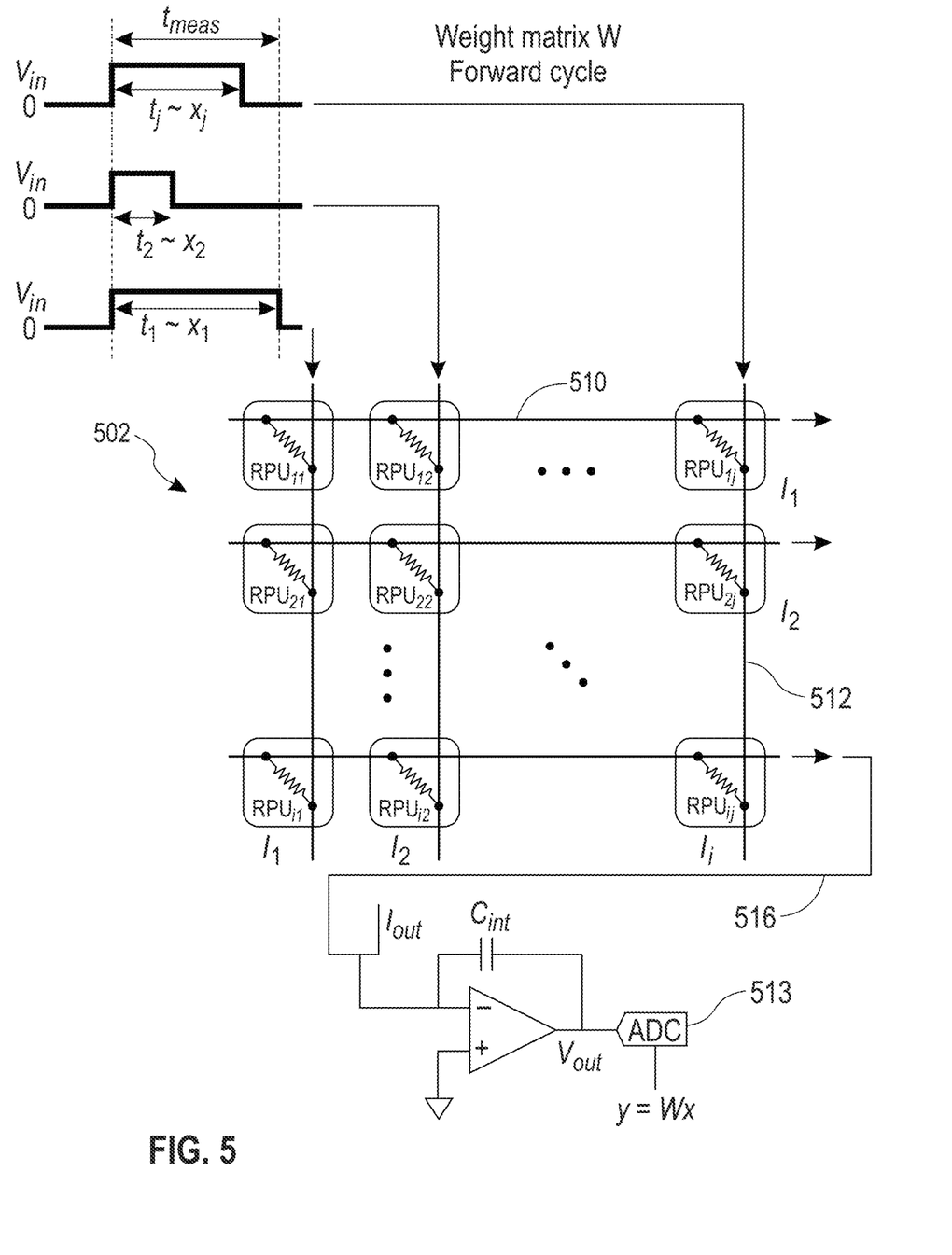
FIG. 5 is a diagram illustrating a forward cycle y=Wx being performed according to an embodiment of the present invention.

The method 300 includes performing a forward cycle using the weight matrix W (block 304). FIG. 5 is a diagram illustrating a forward cycle being performed according to an embodiment of the present invention. The forward cycle involves computing a vector-matrix multiplication (y=Wx) where the input vector x represents the activities of the input neurons, and the weight matrix W stores the weight values between each pair of the input and output neurons. FIG. 5 shows that the vector-matrix multiplication operations of the forward cycle are implemented in a cross-point array 502 of RPU devices, where the stored conductance values in the cross-point array 502 forms the matrix.

The input vector x is transmitted as voltage pulses through each of the conductive column wires 512, and the resulting output vector y is read as the current output from the conductive row wires 510 of cross-point array 502. An analog-to-digital converter (ADC) 513 is employed to convert the analog output vectors 516 from the cross-point array 502 to digital signals. The zero-weight conductance values copied from the reference matrix 406 are used to shift the output values of the RPU devices in cross-point array 502 relative to their symmetry point to account for bias in their switching behavior and to encode negative logical matrix values. To do so, the voltage pulses applied to the cross-point array 502 are also applied to the reference array. The output vector y of cross-point array 502 is then subtracted from that of the reference array.

Figure 6:
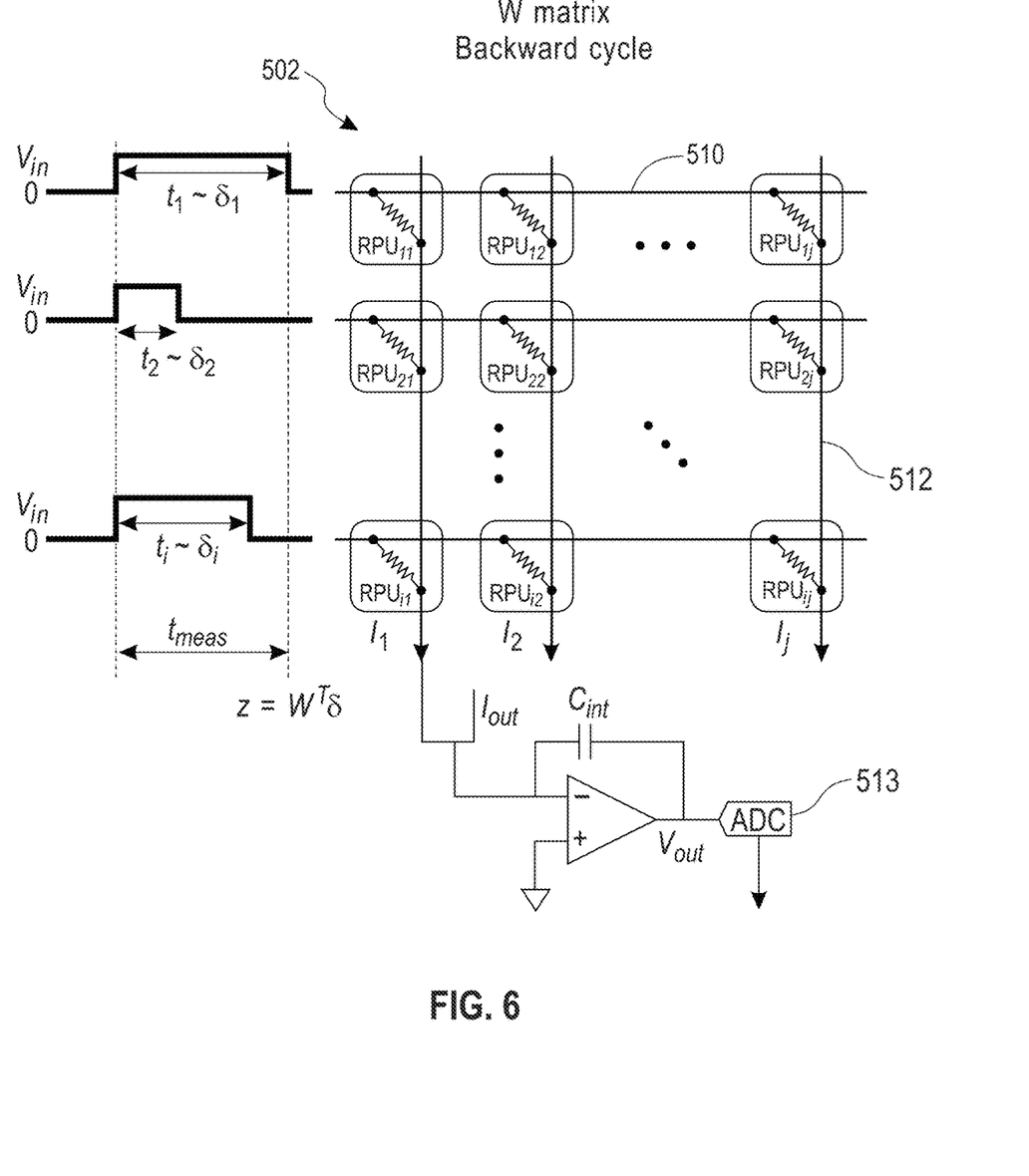
FIG. 6 is a diagram illustrating a backward cycle $z=W^T\delta$ being performed according to an embodiment of the present invention.

The method 300 also includes performing a backward cycle on the weight matrix W (block 306). FIG. 6 is a diagram illustrating a backward cycle being performed according to an embodiment of the present invention. Generally, the backward cycle involves calculating the error signal $\delta$ and backpropagating that error signal $\delta$ through the weight matrix W via a vector-matrix multiplication on the transpose of the weight matrix W (i.e., $z=W^T\delta$), where the vector $\delta$ represents the error calculated by the output neurons and the vector z is further processed using the derivative of neuron non-linearity and then passed down to the previous layers.

FIG. 6 illustrates that the vector-matrix multiplication operations of the backward cycle are implemented in the cross-point array 502. The error signal $\delta$ is transmitted as voltage pulses through each of the conductive row wires 510, and the resulting output vector z is read as the current output from the conductive column wires 512 of the cross-point array 502. When voltage pulses are supplied from the row wires 510 as input to the backward cycle, then a vector-matrix product is computed on the transpose of the weight matrix W.

As also shown in FIG. 6, the ADC 513 is employed to convert the (analog) output vectors 518 from the cross-point array 502 to digital signals. As with the forward cycle described above, the zero-weight conductance values shift the output values of the RPU devices in cross-point array 502 relative to their symmetry point to account for bias in their switching behavior and to encode negative logical matrix values. To do so, the voltage pulses applied to the cross-point array 502 are also applied to the reference array. The output vector z of the cross-point array 502 is then subtracted from that of the reference array.

Figure 7:
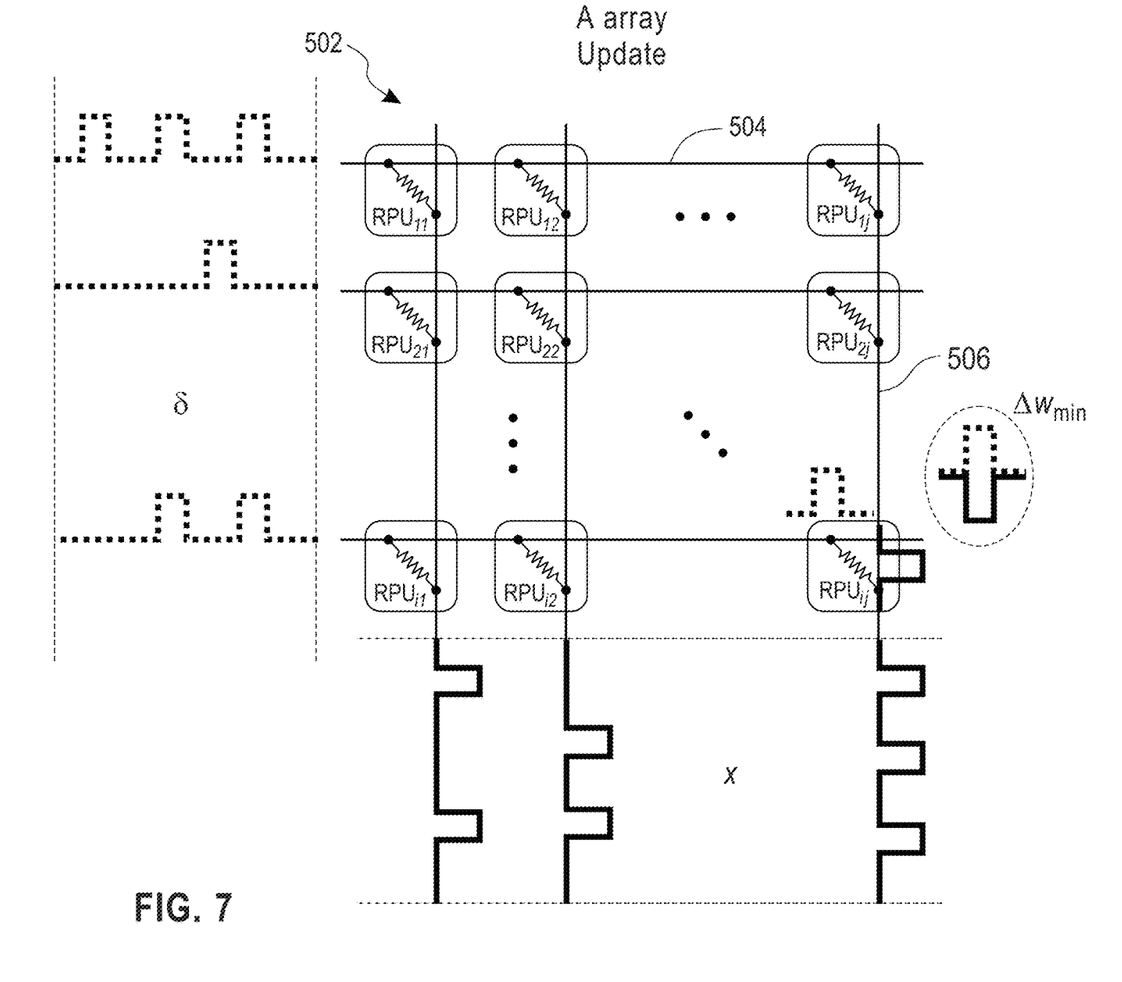
FIG. 7 is a diagram illustrating the array A being updated with x propagated in the forward cycle and δ propagated in the backward cycle according to an embodiment of the present invention.

The method 300 also includes updating the matrix A with input vectors x and $\delta$ (block 308). FIG. 7 is a diagram illustrating the array A 502 being updated with x propagated in the forward cycle and $\delta$ propagated in the backward cycle according to an embodiment of the present invention. The updates are implemented in cross-point array 502 by transmitting voltage pulses representing vector x (from the forward cycle) and vector $\delta$ (from the backward cycle) simultaneously supplied from the conductive column wires 506 and conductive row wires 504, respectively. In this configuration, each RPU in cross-point array 502 performs a local multiplication and summation operation by processing the voltage pulses coming from the corresponding conductive column wires 506 and conductive row wires 504, thus achieving an incremental weight update. The forward cycle (block 304) the backward cycle (block 306) and updating the matrix A with the input vectors from the forward cycle and the backward cycle (block 308) may be repeated a number of times to improve the updated values of the matrix A.

The method 300 also includes performing a forward cycle on the matrix A using an input vector $e_i$, (i.e., $y'=Ae_i$) (block 310). At each time step a new input vector $e_i$ is used and the sub index i denotes that time index. As will be described in detail below, according to an exemplary embodiment, input vector $e_i$ is a one hot encoded vector. For instance, as is known in the art, a one hot encoded vector is a group of bits having only those combinations having a single high (1) bit and all other bits a low (0). To use a simple, non-limiting example for illustrative purposes, assume a matrix of the size 4×4, the one hot encoded vectors will be one of the following vectors: [1 0 0 0], [0 1 0 0], [0 0 1 0] and [0 0 0 1]. At each time step a new one hot encoded vector is used and the sub index i denotes that time index. It is notable, however, that other methods are also contemplated herein for choosing input vector $e_i$. For instance, input vector $e_i$ can instead be chosen from the columns of a Hadamard matrix, a random matrix, etc.

Figure 8:
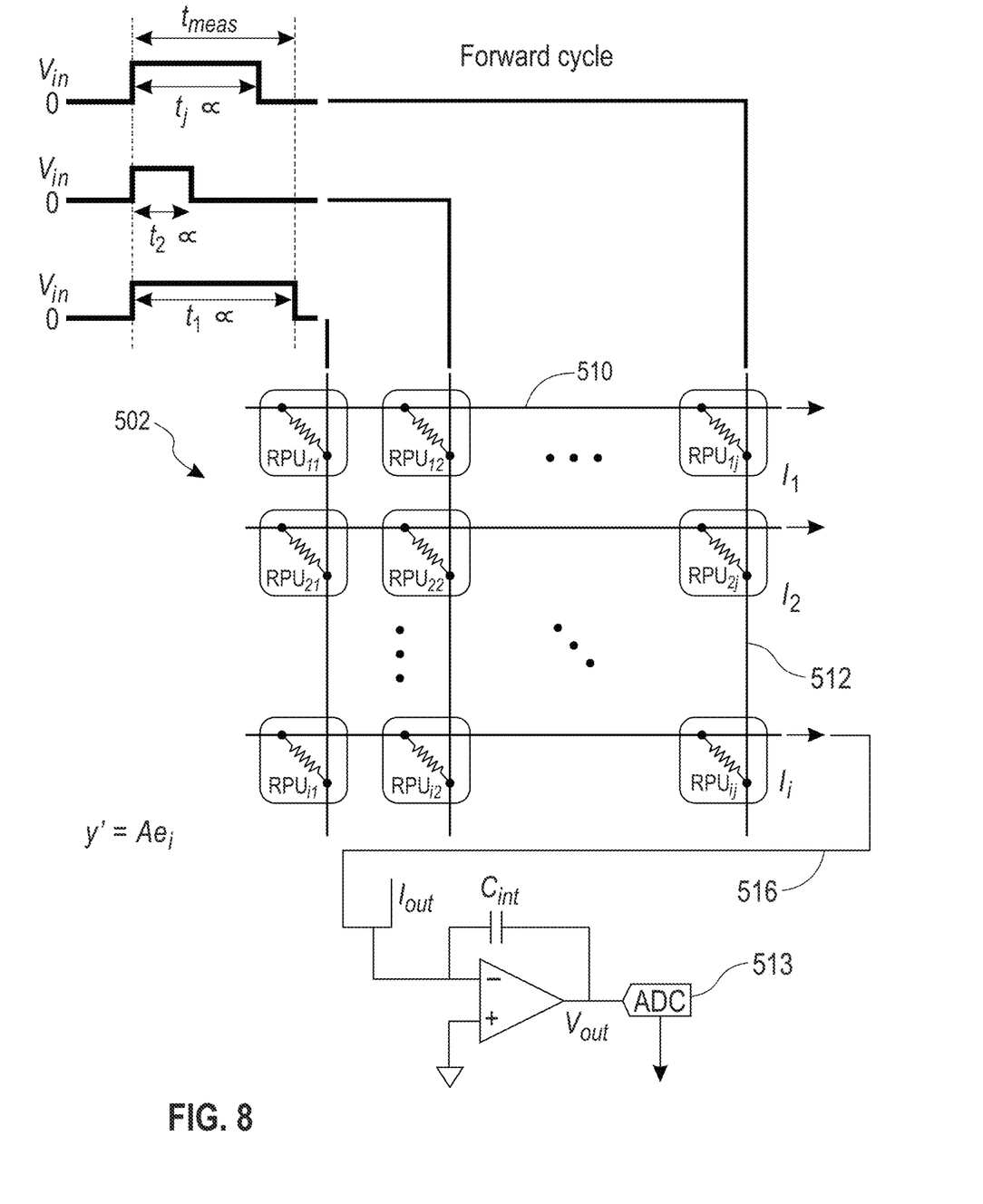
FIG. 8 is a diagram illustrating a forward cycle $y'=Ae_i$ being performed on the weight matrix according to an embodiment of the present invention.

FIG. 8 is a diagram illustrating a forward cycle $y'=Ae_i$ being performed on the A matrix according to an embodiment of the present invention. The input vector $e_i$ is transmitted as voltage pulses through each of the conductive column wires 512, and the resulting output vector y' is read as the current output from the conductive row wires 510 of cross-point array 502. When voltage pulses are supplied from the column wires 512 as input to this forward cycle, then a vector-matrix product is computed.

Figure 9:
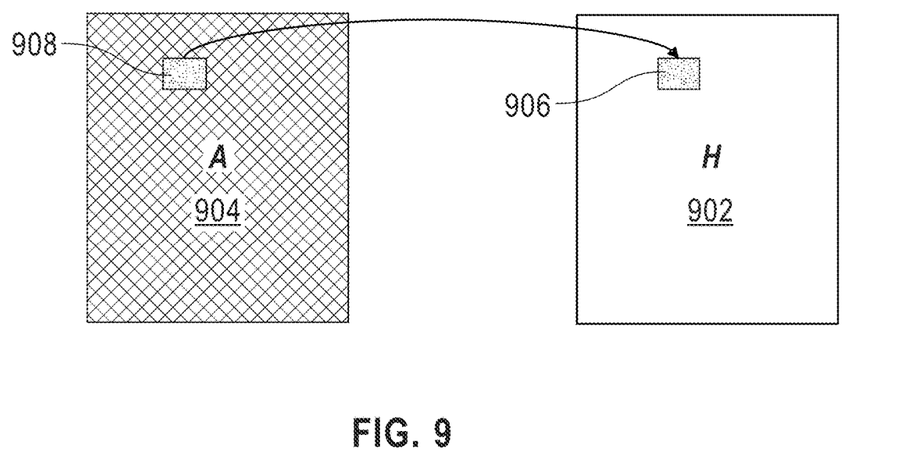
FIG. 9. is a diagram illustrating the hidden matrix H being updated with the values calculated in the forward cycle of the matrix A.

The method 300 includes updating a hidden matrix H using the output vector y' and the input vector $e_i$ (block 312). FIG. 9 is a diagram illustrating the hidden matrix H 902 being updated with the values calculated in the forward cycle of the matrix A 904. The hidden matrix H 902 is most often a digital matrix (rather than a physical device like the matrix A and the weight matrix W) that stores an H value 906 (i.e., $H_{ij}$) for each RPU 908 in the matrix A (i.e., each RPU located at $A_{ij}$). As the forward cycle is performed, an output vector y' $e_i^T$ is produced and the hidden matrix H adds the value to each H value 906. Thus, each time the output vector is read, the hidden matrix H 902 changes. For those RPUs with low noise levels, the H value 906 will grow consistently. The growth of the value may be in the positive or negative direction depending on the value of the output vector y' $e_i^T$. If the output vector y' $e_i^T$ includes significant noise, then it is likely to be positive for one iteration and negative for another. This combination of positive and negative output vector y' $e_i^T$ values means that the H value 906 will grow more slowly and more inconsistently.

As the H values 906 grow, the method 300 includes tracking whether the H values 906 have grown larger than a threshold (block 314). If the H value 906 at a particular location (i.e., Hij) is not larger than the threshold (block 314 "No"), then the method 300 repeats from performing the forward cycle (block 304) through updating the hidden matrix H (block 312). If the H value 906 is larger than the threshold (block 314 "Yes"), then the method 300 proceeds to transmitting input vector ei to the weight matrix W, but only for the specific RPU (block 316). As mentioned above, the growth of the H value 906 may be in the positive or negative direction, so the threshold is also a positive or negative value.

Figure 10:
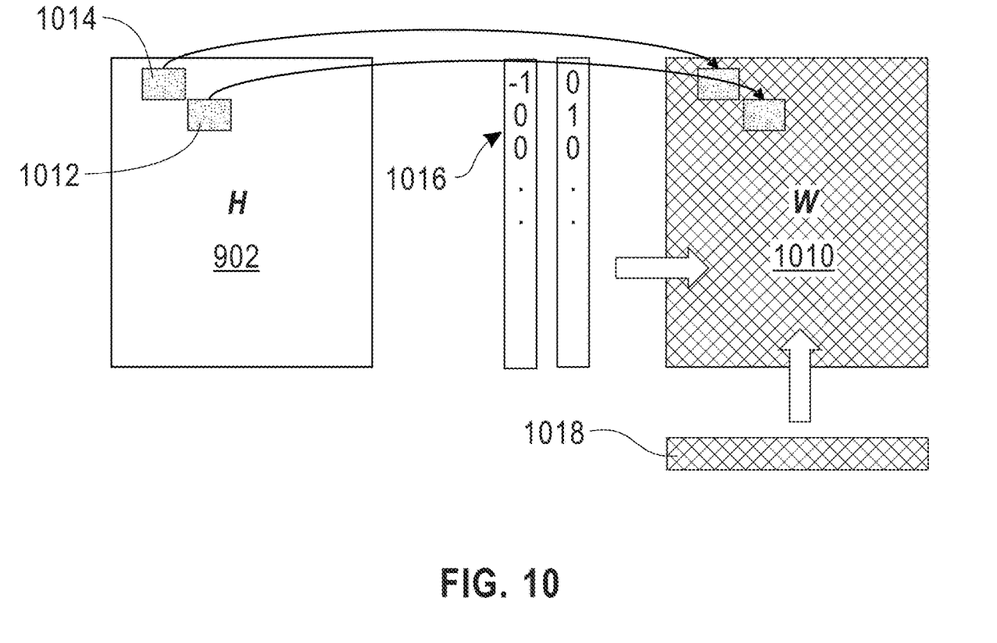
FIG. 10 is a schematic diagram of the hidden matrix H 902 being selectively applied back to the weight matrix W 1010 according to an embodiment of the present invention.

FIG. 10 is a schematic diagram of the hidden matrix H 902 being selectively applied back to the weight matrix W 1010 according to an embodiment of the present invention. FIG. 10 shows a first H value 1012, and a second H value 1014 that have reached over the threshold value and are being transmitted to the weight matrix W 1010. The first H value 1012 reached the positive threshold, and therefore carries a positive one: "1" for its row in the input vector 1016. The second H value 1014 reached the negative threshold, and therefore carries a negative one: "−1" for its row in the input vector 1016. The rest of the rows in the input vector 1016 carry zeroes, since those values (i.e., H values 906) have not grown larger than the threshold value. The threshold value may be much larger than the y' $e_i^T$ being added to the hidden matrix H. For example, the threshold may be ten times or one hundred times the expected strength of the y' $e_i^T$. These high threshold values reduce the frequency of the updates performed on weight matrix W. The filtering function performed by the H matrix, however, decreases the error of the objective function of the neural network. These updates can only be generated after processing many data examples and therefore also increase the confidence level in the updates. This technique enables training of the neural network with noisy RPU devices having only limited number of states. After the H value is applied to the weight matrix W, the H value 906 is reset to zero, and the iteration of the method 300 continues.

After the weight matrix W is updated with ei, 1018, the method 300 continues by determining whether training is complete. If the training is not complete, for example a certain convergence criterion is not met (block 318 "No"), then the method 300 repeats starting again by performing the forward cycle y=Wx. For instance, by way of example only, the training can be considered complete when no more improvement to the error signal is seen. When training is completed (block 318 "Yes"), the method 300 ends.

Figure 11:
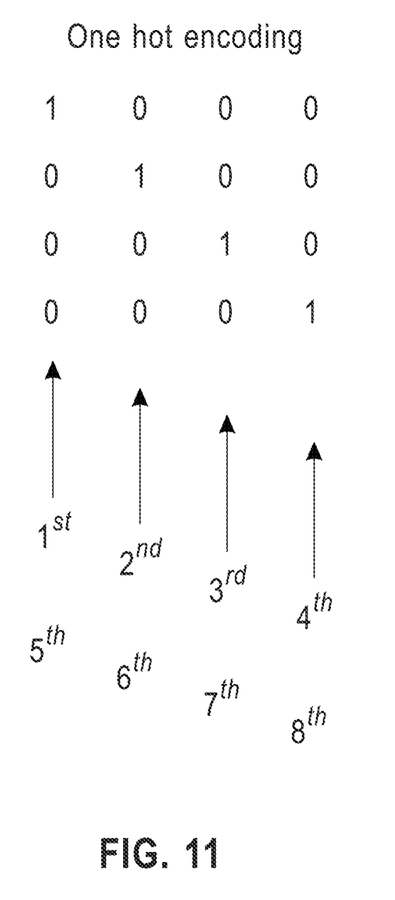
FIG. 11 is a diagram illustrating an exemplary one hot encoded vector according to an embodiment of the present invention.
Figure 12:
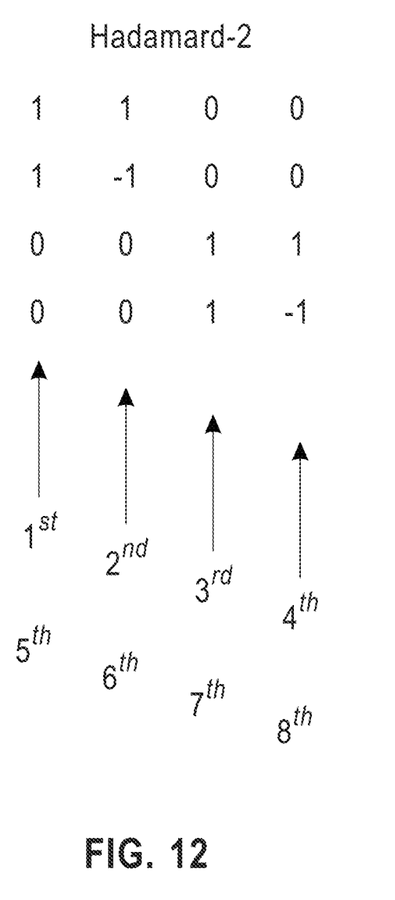
FIG. 12 is a diagram illustrating an exemplary Hadamard matrix of order 2 according to an embodiment of the present invention.
Figure 13:
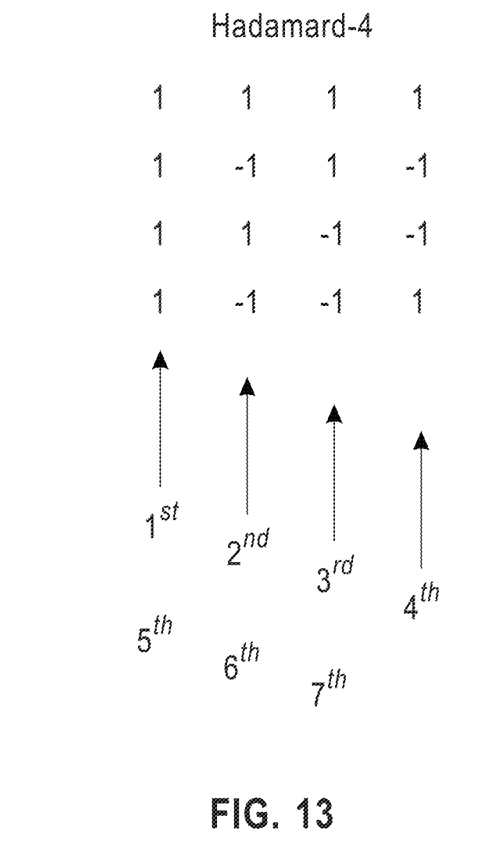
FIG. 13 is a diagram illustrating an exemplary Hadamard matrix of order 4 according to an embodiment of the present invention.

As highlighted above, according to an exemplary embodiment, the input vector $e_i$ is a one hot encoded vector which is a group of bits having only those combinations with a single high (1) bit and all other bits a low (0). See, for example, FIG. 11. As shown in FIG. 11, given a matrix of the size 4×4, the one hot encoded vectors will be one of the following vectors: [1 0 0 0], [0 1 0 0], [0 0 1 0] and [0 0 0 1]. At each time step a new one hot encoded vector is used, denoted by the sub index i at that time index. According to another exemplary embodiment, the input vector $e_i$ is chosen from the columns of a Hadamard matrix. As is known in the art, a Hadamard matrix is a square matrix with entries ±1. See, for example, FIG. 12 (a Hadamard matrix of order 2) and FIG. 13 (a Hadamard matrix of order 4). The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk™, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
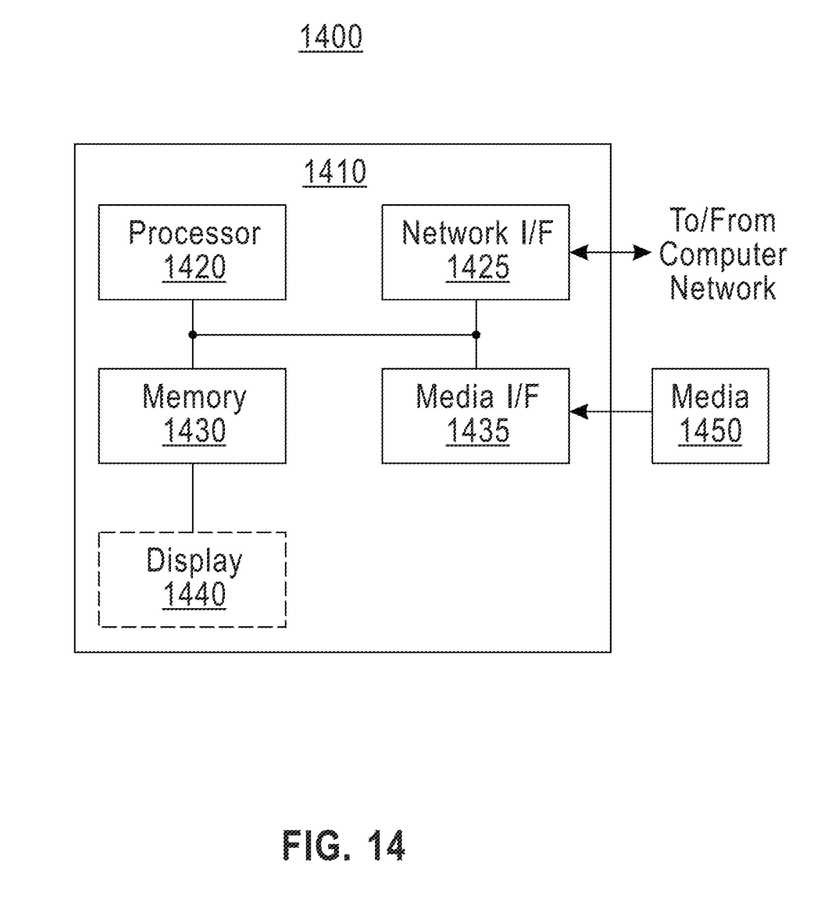
FIG. 14 is a diagram illustrating an exemplary apparatus that can be employed in carrying out one or more of the present techniques according to an embodiment of the present invention.

Turning now to FIG. 14, a block diagram is shown of an apparatus 1400 for implementing one or more of the methodologies presented herein. By way of example only, apparatus 1400 can be configured to control the input voltage pulses applied to the arrays and/or process the output signals from the arrays.

Apparatus 1400 includes a computer system 1410 and removable media 1450. Computer system 1410 includes a processor device 1420, a network interface 1425, a memory 1430, a media interface 1435 and an optional display 1440. Network interface 1425 allows computer system 1410 to connect to a network, while media interface 1435 allows computer system 1410 to interact with media, such as a hard drive or removable media 1450.

Processor device 1420 can be configured to implement the methods, steps, and functions disclosed herein. The memory 1430 could be distributed or local and the processor device 1420 could be distributed or singular. The memory 1430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1420. With this definition, information on a network, accessible through network interface 1425, is still within memory 1430 because the processor device 1420 can retrieve the information from the network. It should be noted that each distributed processor that makes up processor device 1420 generally contains its own addressable memory space. It should also be noted that some or all of computer system 1410 can be incorporated into an application-specific or general-use integrated circuit.

Optional display 1440 is any type of display suitable for interacting with a human user of apparatus 1400. Generally, display 1440 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:
1. A deep neural network (DNN), comprising:
an A matrix comprising resistive processing unit (RPU) devices separating intersections between conductive row wires and conductive column wires, whereby the RPU devices comprise processed gradients for weighted connections between neurons in the DNN;
a weight matrix W comprising RPU devices separating intersections between conductive row wires and conductive column wires, whereby the RPU devices comprise weighted connections between neurons in the DNN; and a hidden matrix comprising an H value for each RPU device in the weight matrix W, wherein each of the H values comprises a summation of iteratively added values from the matrix A until at least one H value is over a threshold.

2. The DNN of claim 1, further comprising a reference array, interconnected with the A matrix array, that stores zero-weight conductance values for the RPU devices in the cross-point array.

3. The DNN of claim 1, wherein the hidden matrix H comprises digitally stored values for each RPU device in the weight matrix W.

* * * * *